United States Patent
Erickson

(10) Patent No.: US 8,162,738 B2
(45) Date of Patent: Apr. 24, 2012

(54) LOTTERY/ONLINE GAMING BET ADMINISTRATION SYSTEM AND METHOD

(76) Inventor: Bertel Ronald Erickson, Union, NJ (US)

( * ) Notice: Subject to any disclaimer, the term of this patent is extended or adjusted under 35 U.S.C. 154(b) by 30 days.

(21) Appl. No.: 12/815,480

(22) Filed: Jun. 15, 2010

(65) Prior Publication Data

US 2011/0306399 A1 Dec. 15, 2011

(51) Int. Cl.
*A63F 9/24* (2006.01)
(52) U.S. Cl. ............... 463/17; 463/16; 463/25; 463/30; 463/42
(58) Field of Classification Search ............ 463/16, 463/17, 25, 30, 42; 705/51, 59
See application file for complete search history.

(56) References Cited

U.S. PATENT DOCUMENTS

| | | | |
|---|---|---|---|
| 5,444,223 A | 8/1995 | Blama | |
| 5,682,143 A | 10/1997 | Brady | |
| 2006/0019745 A1* | 1/2006 | Benbrahim | 463/29 |
| 2008/0220871 A1* | 9/2008 | Asher et al. | 463/42 |
| 2010/0093428 A1* | 4/2010 | Mattice et al. | 463/25 |
| 2010/0160022 A1* | 6/2010 | Oram | 463/17 |
| 2010/0298054 A1* | 11/2010 | Liber et al. | 463/42 |
| 2010/0304819 A1* | 12/2010 | Stockdale et al. | 463/16 |
| 2010/0304853 A1* | 12/2010 | Kukita | 463/30 |
| 2010/0323785 A1* | 12/2010 | Motyl et al. | 463/25 |

* cited by examiner

*Primary Examiner* — Pierre Eddy Elisca
*Assistant Examiner* — Shahid Kamal
(74) *Attorney, Agent, or Firm* — Michael J. Feigin, Esq.; Feigin & Associates, LLC

(57) ABSTRACT

Embodiments of the disclosed technology provide a system and method for electronic lottery and or online gaming bet placement and management employing Radio Frequency Identification technology. The system and method both employ use of a plurality of passive RFID tags. Each tag comprises stored data. The data may include a read-only memory area and a writable memory area. The system and method also utilize a data storage medium under the operative control of a lottery/gaming administrator. The data storage medium contains data associated with a plurality of gambling accounts. The data may include personal information and payout information. Each gambling account is associated with at least one RFID tag via the unique read-only tag number stored therein.

20 Claims, 5 Drawing Sheets

LOTTERY/ONLINE GAMING BET ADMINISTRATION SYSTEM AND METHOD

FIELD OF THE DISCLOSED TECHNOLOGY

The disclosed technology relates generally to Radio Frequency Identification tagging. More specifically, the disclosed technology relates to a lottery/online gaming system employing Radio Frequency Identification technology.

BACKGROUND OF THE DISCLOSED TECHNOLOGY

State-sponsored lotteries have been in existence since the 1930's. They have become very common in the United States, and can now be found in 38 states. A typical lottery game involves a participant predicting the correct numbers from a drawing. In a given state, the lottery will have authorized retailers located around the state to sell tickets for this drawing. In order to place a bet, a participant must go to the retailer and either fill out a bet slip indicating the numbers they wish to pick, or dictate the numbers to a store clerk who enters them in electronically and prints a bet slip. If the participant chooses a certain number of numbers correctly, then the retailer issues a payment for the bet slip, which is usually in the form of cash, credit card, debit card, check, money order or any other form of payment which may be accepted at a given retailer.

Many problems and shortcomings exist in the present state-sponsored lottery systems. One shortcoming is that a frequent player must fill out a bet slip or dictate numbers to a store clerk every time he or she wishes to place a bet. Furthermore, the physical exchange of some payment mechanism is required for all transactions. Thus, the transaction takes considerable time to be completed being that the numbers must be entered, a payment must be issued, and a ticket must be printed and given to the participant.

Another problem is lack of security in the event of a win because the bet slip has or may become misplaced or stolen. Currently, no system is in place to ensure that a person who turns in a winning ticket is the actual purchaser of that ticket. Likewise, if a person loses a ticket, there is no concrete system in place to ensure that person his or her winnings. There have been many instances of lost lottery tickets in the past. For example, the system currently in place in New York allows the alleged winner to file a claim with the lottery commission. However, current state law dictates that if the ticket is turned in within a year of the claim, whoever turned in the ticket is entitled to the winnings. This is regardless of whether or not they were the purchaser of the ticket. This flaw in the current lottery system opens doors for theft and fraud. In the event of a win, the system places an exorbitant value on a small piece of paper which can easily be lost or misplaced.

Accordingly, there exists the need for an improved electronic lottery/online gaming bet placement and management system and method that facilitates quick and efficient administration of bets and secure management and distribution of winnings. Also, Federal law prohibits government-regulated online betting across state lines. Therefore a need exists to reliably identify an online player as to the state in which he resides and as to his legal age when placing casino-style wagers (such as blackjack, baccarat, etc.) online using the Internet

SUMMARY OF THE DISCLOSED TECHNOLOGY

The disclosed technology described herein addresses a need unfulfilled in the prior art by providing an improved electronic lottery bet placement and management system and method employing Radio Frequency Identification (RFID) technology in order to facilitate quick and efficient administration of bets, and secure management and distribution of winnings.

Accordingly, it is an object of the disclosed technology to provide an improved electronic lottery system which employs Radio Frequency Identification technology in order to allow a participant to quickly and conveniently place a lottery bet.

It is also an object of the disclosed technology to provide an improved electronic lottery system which provides secure management of bets and distribution of winnings.

It is a further object of the disclosed technology to provide an improved electronic lottery system which allows for self-placed bets in lottery or online Internet gambling (such as blackjack, poker, and other games that would be allowed under state law) transactions from home or at a retailer.

It is yet another object of the disclosed technology to provide an improved electronic lottery system which employs Radio Frequency Identification technology in order to allow a participant to place a bet without entering/dictating/filling-in numbers or necessitating the physical exchange of a payment means.

Therefore, provided herein is a method and system for electronic lottery bet placement and management employing Radio Frequency Identification technology in order to facilitate quick and efficient administration of bets and secure management and distribution of winnings.

In an embodiment of the disclosed technology, a system for electronic lottery or other gaming bet placement is disclosed. The system includes a plurality of passive Radio Frequency Identification ("RFID") tags. Each tag contains stored data. In one embodiment the stored data is a read-only tag number. In another embodiment the stored data may include a writable memory area. In this embodiment, the writable memory area may allow reference to a previously entered bet, which may be reused. The system also includes a data storage medium under the operative control of a lottery administrator. The data storage medium has stored thereon data associated with a plurality of gambling accounts. In one embodiment, the data in the gambling accounts may include personal information and payout information corresponding to an individual. In another embodiment, the data in the gambling account may also be payment information. Each gambling account is associated with a least one of the aforementioned RFID tags.

The system also includes a Near Field Communication (NFC) RFID tag reader/writer, in embodiments of the disclosed technology. The tag reader/writer is operable to receive the read-only tag number from each of the plurality of RFID tags. The tag reader/writer (which may be referred to simply as a "tag reader" in this disclosure) also is able to associate a gambling account with a received bet based on the retrieved tag number. In one embodiment, the system is capable of retrieving a previous bet using secure information from the RFID tag to be used to place a new bet.

In another embodiment of the disclosed technology, the system may also include a wired interface configured for placing a on-line (such as from a casino facility offering blackjack, etc) wager from an individual associated with one of the gambling accounts. The interface is inoperable for receiving a wager before the read-only tag number has been read by the tag reader.

In yet another embodiment of the disclosed technology, the system may also employ a means for communicating in order to notify an individual of a winning lottery event. The modes of communication may include electronic mail, mobile text message, and/or phone call.

In still another embodiment of the disclosed technology, the system may also include an electronic interface to be used by an individual for the purpose of managing his or her gambling account. Federal Law prohibits government-regulated on-line betting across state lines, and the disclosed technology allows user identification as to age and State residency such as that provided by state Drivers License or county ID data.

In still another embodiment of the disclosed technology the RFID tag may also include a universal serial bus (USB) connector in order to connect the tag via a port on the tag reader/writer, a personal computer, or some other device.

In an embodiment of the disclosed technology, a method for lottery wager collection and administration follows the foregoing steps. First, a data storage medium is provided. The data storage medium contains a plurality of gambling accounts, each of which are associated with a unique, corresponding individual. Next, a plurality of passive RFID tags are provided. The tags have stored data. In one embodiment, the stored data is in the form of a read-only tag number. In another embodiment, the stored data may also alpha-numeric data related to the individual bettor associated with the unique tag number. The tag numbers are then correlated with a unique account stored in the data storage medium. In one embodiment, the accounts may contain personal information. In another embodiment, the accounts may also contain bet information. A near field communication RFID tag reader is then provided for receiving a read-only tag number from one of the RFID tags. The method proceeds when the tag reader gathers the tag number from one or more of the RFID tags and identifies an account to which the tag number correlates.

In another embodiment of the disclosed technology, the method may comprise the additional step of administering the placement of a bet via the tag reader/writer using personal information. In a further embodiment, the method may comprise the additional step of notifying an individual associated with an account in the event of a winning bet. In one embodiment, the notification may be carried out via mobile text message or e-mail.

In another embodiment of the disclosed technology, the method may comprise the additional step of automatically receiving a bet electronically via the tag reader using the bet information and the personal information.

In yet another embodiment of the disclosed technology, the method may comprise the additional receiving a bet wirelessly via the tag reader using the stored data and the personal information.

In yet another embodiment of the disclosed technology, the tag reader/writer may include a universal serial bus (USB) port. In a further embodiment of the disclosed technology the method may comprise the additional step of receiving data from and writing data to the RFID reader tag via the USB connector plugged into the USB port.

In accordance with these and other objects which will become apparent hereinafter, the disclosed technology will now be described with particular reference to the drawings.

A better understanding of the disclosed technology will be obtained from the following detailed description of the preferred embodiments taken in conjunction with the drawings and the attached claims.

DETAILED DESCRIPTION OF EMBODIMENTS OF THE DISCLOSED TECHNOLOGY

Embodiments of the disclosed technology provide a system for electronic gaming bet placement and management employing Radio Frequency Identification technology. The system comprises a plurality of passive RFID tags. Each tag comprises stored data. The data may include a read-only memory area and a writable memory area. The system also comprises a data storage medium under the operative control of a lottery/gaming administrator. The data storage medium comprises or contains data associated with a plurality of gambling accounts. The data may include personal information and payout information. Each gambling account is associated with at least one RFID tag via the unique read-only tag number stored therein.

With reference now to the drawings, a system for improved lottery bet placement and management is shown.

Figure 1:
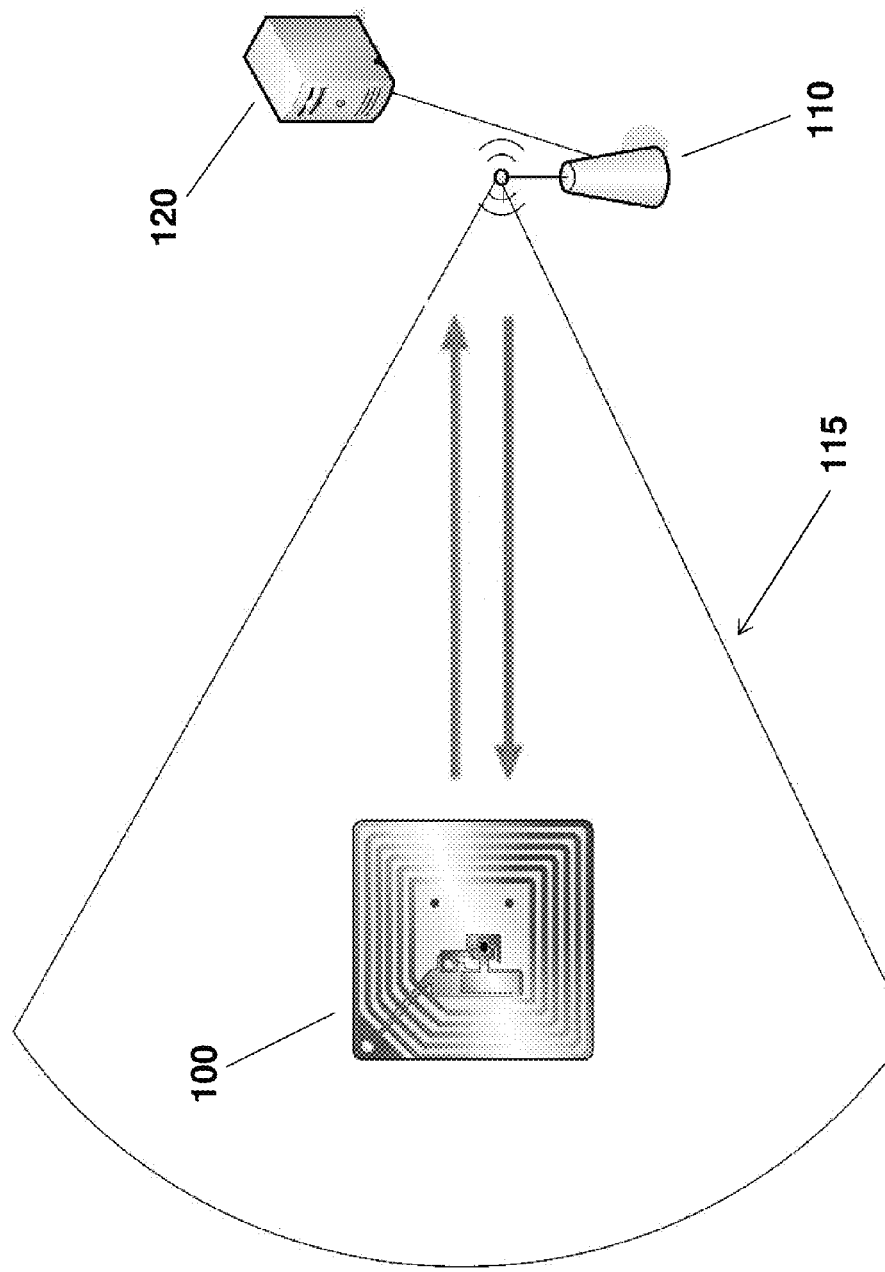
FIG. 1 shows a high level drawing of an exemplary Radio Frequency Identification system arrangement.

FIG. 1 shows a high level drawing of an exemplary Radio Frequency Identification (RFID) system arrangement. RFID involves the use of an object (typically, an RFID tag communicated via Near Field Communication (NFC)) applied to or incorporated into a housing, device, animal, or person for the purpose of identification and tracking using radio waves. In Radio Frequency Identification tagging, an information carrying device, or tag, functions in response to a coded radio frequency ("RF") signal transmitted from a base station or tag reader. The RF carrier signal reflects from the tag and can be demodulated to recover information stored in the tag. The tag typically includes a semiconductor chip having RF circuits, logic, and memory, as well as an antenna. Various tag structures, circuits, and programming protocols are known in the art. Examples are described in U.S. Pat. No. 5,682,143 (Brady et al.) and U.S. Pat. No. 5,444,223 (Blama), both of which are incorporated herein by reference.

RFID systems typically have three components: (1) a tag (the item being identified), (2) an interrogator or reader, and (3) a data managing medium (typically including cabling, computers, and software which tie together the tags and interrogators into a useful solution). RFID products are typically designed to detect tags when they pass within a predefined range of the tag reader.

There are generally two types of RFID tags known in the art: passive RFID tags and active RFID tags. Either may be used in embodiments for the disclosed technology. Passive RFID tags, unlike active ones, do not require a battery in order to transmit a RF signal frequency. Instead, passive RFID tags rely on an external source to provoke signal transmission. The tag reader/writer transmits the operating power for these tags. As a result, such passive RFID systems generally have a very limited transmission range. However, passive RFID tags may generally be manufactured to be smaller in size than active RFID tags due to less parts being required. Also, passive tags do not contain a battery that must periodically be replaced.

Most passive RFID systems work as follows. A reader emits an electromagnetic field for the purpose of powering the tag. A coil in the tag is powered by the electromagnetic field, causing the tag's circuitry to "wake up." The tag uses this power to send an identifying signal back to the interrogator.

Although most passive RFID systems are read-only (that is, the tags in such system respond to a query by reading information from their memory and sending the information back to the interrogator), the tags used in some passive RFID systems have a limited ability to accept information and instructions from the interrogator, for example read/write capabilities in smart cards (electronic money) and "electronic manifests" in industrial applications.

Referring again to FIG. 1, Radio Frequency Identification (herein "RFID") involves the use of an object (typically referred to as an RFID tag) applied to or incorporated into a housing for the purpose of identification and tracking using radio waves. An RFID tag 100 is shown in FIG. 1. The RFID tag 100 may be embedded in an identification-type card such a 3" by 5" flat card, credit card size card, a keychain housing, or any other portable medium which may be contemplated. For the purposes of this specification, the RFID tag and any housing will be collectively referred to as "RFID Tag" which is understood to communicate via short range radio communication, such as near-field communication (NFC). The RFID tag 100 is issued to a player and is used to identify that player. In an embodiment of the disclosed technology the RFID tag 100 contains read-only data in the form of a unique read-only tag number. The tag number is unique to the tag and therefore to the holder, and is used to identify the tag holder for the purposes of bet administration. Referring still to FIG. 1, a Near Field Communication RFID tag reader/writer 110 is shown. The tag reader/writer 110 may, for instance, be located in a retail location licensed to sell lottery tickets. The tag reader 110 works by emitting radio frequency signals to a predisposed area 115 around the reader. When a compatible RFID tag 100 comes within range of the tag reader, the tag reader is able to read the data stored on the RFID tag. The tag reader 110 associates the tag number stored on the RFID tag with a gambling account, the account comprising data stored on a data storage medium 120. The data storage medium 120 is under the operative control of a lottery/gaming administrator and may or may not be physically located near the tag reader/writer. Should the data storage medium 120 be remotely located, it may communicate with the reader/writer through a local area network, a wide area network, wireless local area network, or any other method for exchanging data remotely. The gambling account data stored on the data storage medium 120 may include personal information, payment information, and payout information. The personal information may include any identifying information about a person such as name, address, and other contact information. Payment information may include any information pertaining to a means of payment for the associated account holder such as credit/debit card number, checking account number, an online merchant or monetary account number (e.g. PayPal), etc. The payment information may also include a lottery or online gambling account balance to which an account holder may distribute funds as needed. Payout information may also be stored on the data storage medium 120. Such payout information may include information necessary to enable the lottery administrator to distribute winnings to an account holder (i.e. to checking account or to lottery account balance). The payout information may also include information necessary to enable the lottery administrator to contact the account holder in the event of a winning bet. Facilitation of notifying a winner may be via electronic mail ("e-mail"), text message, or phone call.

In one embodiment of the disclosed technology, the RFID tag 100 data may only consist of a unique read-only tag number. In this embodiment, upon identification by a tag reader 110, the number serves to identify the account holder. In this or other embodiments, the account holder may now place a bet using a traditional or known method of payment exchange or using funds from an account balance associated with the tag number and/or gambling account.

In another embodiment, the RFID tag 100 data consists of consists essentially of a unique read-only tag number as well as data stored on a re-writable data storage area. The re-writable data storage area is capable of retrieving previously placed bet in the gaming system with associated number combination. In this embodiment, upon recognition, the tag reader 110 not only identifies the account holder, but also enables the account holder to place a bet without verbally dictating the desired numbers to an attendant or physically entering them into an interface.

In yet another embodiment, the RFID tag 100 further comprises a universal serial bus (herein "USB") connector for engagement with a USB port on a computer. Upon connection, in a first embodiment, a user, such as an administrator, may manipulate the re-writeable data stored on the RFID tag 100 using an electronic interface. In a second embodiment, a user, such as a player or person whom is associated with the RFID tag 100 may place a wager from his or her personal computer. The manipulating may further include changing the betting information and settings stored on the re-writable portion of the RFID tag's 100 storage. In a further embodiment, the user may be able to access their corresponding gaming account information stored on a remote server using a local area connection. It is contemplated that the user may update personal information, payment information, payout information, betting information, and other account setting via a remote server.

Figure 2:
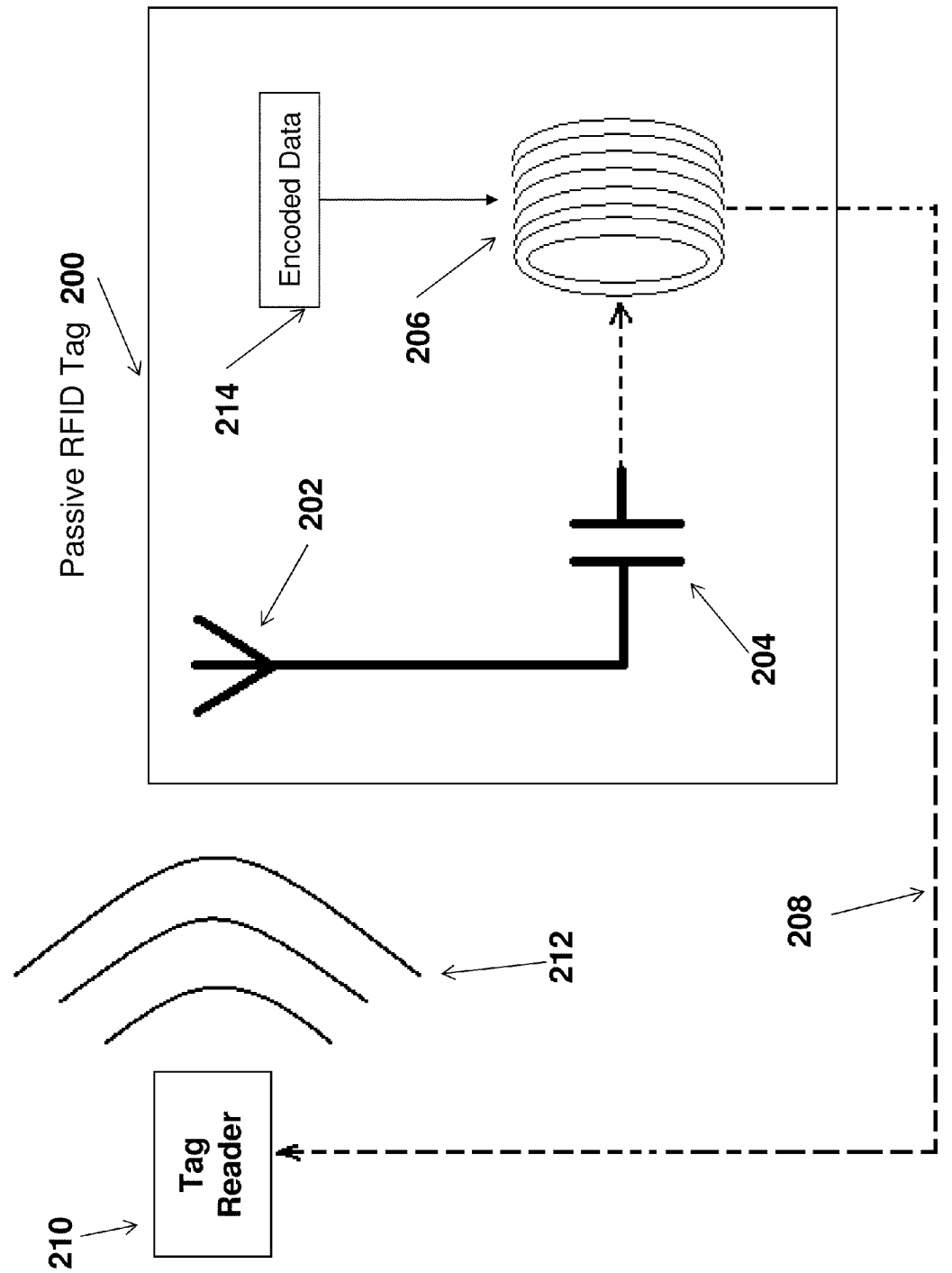
FIG. 2 is a schematic of the interaction between the RFID tag and tag reader/writer of embodiments of the disclosed technology, communicating via Near Field Communication.

FIG. 2 is a schematic of the interaction between the RFID tag and tag reader/writer of embodiments of the disclosed technology, communicating via Near Field Communication. The disclosed technology of FIG. 2 employs the use of passive RFID tags. A passive RFID tag does not comprise a battery, unlike active RFID tags. This enables the passive RFID tags to last longer and to be manufactured at a much smaller size. With reference to FIG. 2, a typical passive RFID tag arrangement 200 comprises of or consists of an antenna 202, capacitor 204, antenna coils 206, and encoded data 214, that is, a string of stored data. When the tag 200 comes within range of a tag reader 210, the tag reader/writer broadcasts an electromagnetic radio signal 212 to the tag. The antenna 202 in the tag 200 receives the signal and stores a charge in the capacitor 204. When the capacitor 204 has built up sufficient energy, it releases it to the tag's coils 206. Using the provided energy, the tag's coils release encoded radio waves 208 containing the data stored in the tag 214. The reader 210 receives the encoded waves 208 and demodulates them. The whole process can occur within milliseconds, and be almost instantaneous. The bridge between the tag and the tag reader/writer form an invisible electromagnetic circuit of sorts.

Figure 3:
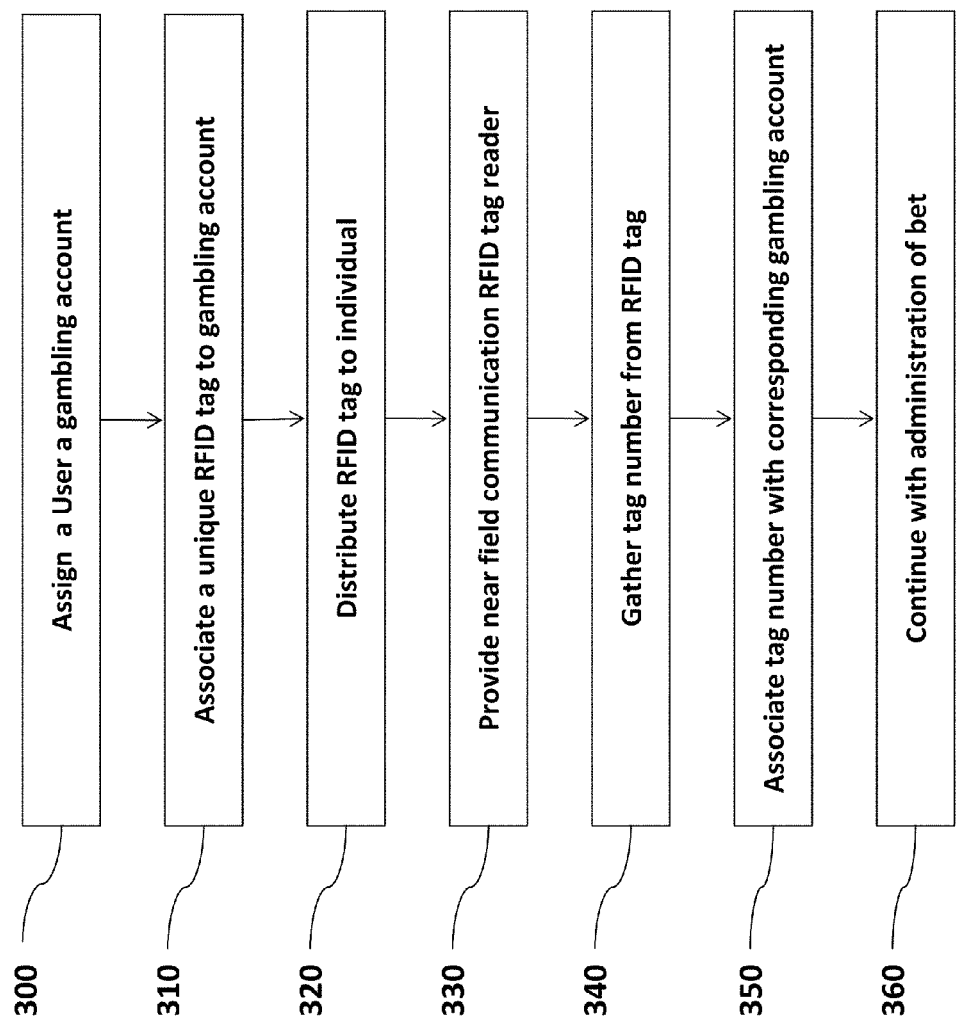
FIG. 3 shows a flow chart of an exemplary overview of a method of carrying out embodiments of the disclosed technology relative to one individual.

FIG. 3 shows a flow chart of an exemplary overview of a method of carrying out embodiments of the disclosed technology relative to one individual. The method begins in step 300 when a lottery/gaming administrator assigns a gaming account to a user. The gambling account is stored, along with a plurality of other gambling accounts, on a data storage medium provided by the lottery administrator (such as a data storage medium described in FIG. 5). In step 310, an RFID tag with a unique tag number is associated with the user's gambling account. In step 320, the RFID tag is distributed to the user. The tag may be distributed via mail or may be purchased at an authorized lottery retailer. In step 330, a Near Field Communication tag reader/writer is provided at one or more locations, such as at retail locations or connected to a person's computer, and is configured read the RFID tags issued by the lottery/gaming administrator. The data read is verified, either at the point of reading, at a central server under the operative control of the lottery/gaming administrator, or both. As a result of the verification, in step 340, the tag reader recognizes the user's tag when the user comes within range. Upon recognition of a compatible tag associated with a person (step 350), a corresponding gambling account stored on the data storage medium is used. The tag reader may retrieve any information stored on the data storage medium such as personal information, payment information, payout information, and any other relevant account information. At this point, in step 360, the tag reader/writer is ready to administer a bet using the account information. (Alternatively, the person may have placed their bet already and the steps shown in FIG. 3 take place afterwards as a method of confirmation of the bet. Additionally, a prior bet may be read from the RFID card or a central server location and the user may be prompted to determine if the same bet should be placed.)

Figure 4:
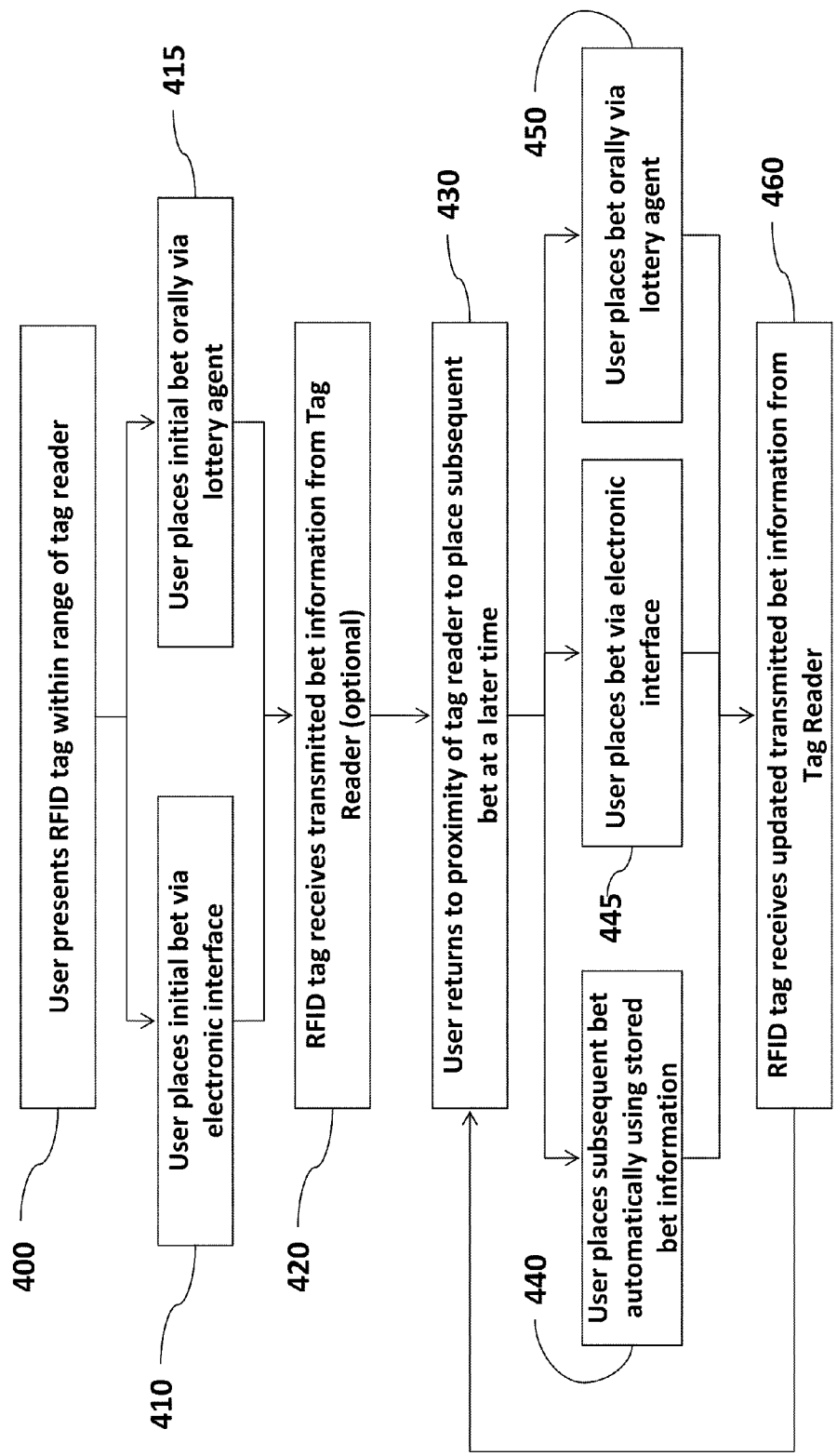
FIG. 4 shows a flow chart of a method of carrying out embodiments of the disclosed technology for placing a bet.

FIG. 4 shows a flow chart of a method of carrying out embodiments of the disclosed technology for placing a bet. The administration of a bet begins with a user presenting an RFID tag within range of a tag reader/writer at an authorized lottery or online gaming retailer or casino operator, such as for a first time after being issued the tag, or any subsequent time. In embodiments of the disclosed technology, a gaming administrator is defined as a government run or government controlled operator of a game of chance such as a lottery game. In further embodiments, a gaming administrator is defined as a casino or private operator of a game of chance. Upon recognition of the tag in a fashion similar to that described with respect to FIG. 3, the user is prompted to place his or her wager. In step 410, the wager may be placed via an electronic interface on the tag reader. Alternatively, in step 415, the bet may be placed orally by dictating the desired numeric combination to a lottery agent. The lottery agent enters the bet information into the tag reader/writer and associates it with the RFID tag recognized by the reader/writer. As mentioned previously, the method of payment may be an exchange at the point of sale (i.e. cash, credit card, etc.) or through use of electronic funds taken from the user's account balance. Upon completion of the transactions, in step 420, the tag reader transmits the betting information wirelessly to the RFID tag for storage on the rewritable portion of the tag's data storage. This step is optional—that is, it may be decided on by the user, by a specific retailer, or may only be carried out in some embodiments of the disclosed technology. When carried out, the bet information is stored so it can be accessed at a later time in order to enable quick and efficient placement of a bet the next time the user desires to play the lottery. That is, a previously stored bet may be recalled or may be the default bet prompted to the lottery player the next time his card is read for purposes of placing a bet. Because it is the strategy of many lottery players to play the same number combinations every time they play, the process of placing a "repeat" bet is simplified greatly by retrieving previously placed bets from the lottery network using the secure, unique tag ID code.

In embodiments of the disclosed technology, if a card is lost or stolen, it cannot be used to access accounts without the proper PIN code stored on the RFID chip. Similarly, in such embodiments, if a card is copied or cloned, the unique chip ID will be incorrect. This is because the unique code for each RFID transponder is pre-programmed and is unchangeable. When contents of card are copied, the unchangeable identifier cannot be copied. Rather, when another card is used with copied data, it's identifier is transmitted and so fraud is prevented.

In order to further ensure security, cards are issued by the gaming administrator (such as a state gaming commission or a private casino, or, they're agents such as the division of motor vehicles or a security official, respectively). When issued, an unlocked 4-digit area (block of 8-bit alpha and/or numeric characters) for a PIN code (e.g. with a pre-written 1234) may be issued. When a card is placed on the reader/writer associated for the first time, or a reader/writer operated by the gaming administrator or his agent, one will be asked change this code and enter a new personal code (PIN code) in order to initiate a transmission. The chip will not send its unique ID unless the PIN code is correct.

Referring still to FIG. 4, in step 430, the user returns to the lottery retailer (or any other lottery retailer which employs the use of a tag reader) at a later time or date. Once again, when the user is present with the RFID tag in range of the tag reader, the tag reader will recognize the tag and retrieve the corresponding account information. However, in this instance and all subsequent instances, the user has the option of electing to replay his or her previous bet. This option is shown in Step 440, and may entail the user simply pushing a button or telling the clerk to place replay the previous bet using the information retrieved by the RFID tag. Alternatively, in steps 445 and 450 the user has the option of placing a bet using a new numeric sequence and combination. Similar to steps 410 and 415, steps 445 and 450 are carried out either using an electronic interface or with the assistance of a lottery agent. Step 460 occurs regardless of which bet placement option is employed by the user. From step 460, the method proceeds back to step 430 wherein the user may return to a tag reader in order to replay a previously placed bet. Steps 430 through 460 may repeat an unlimited amount of times. From FIG. 4, the simplification of the betting process when the previous bet is stored on the RFID tag becomes apparent. The process becomes even more streamlined if electronic funds from an associated gambling account balance are used to pay for the bet. In such an embodiment, no further action is required to be taken on behalf of the user aside from electing to replay a previous bet and confirming payment with funds from user's balance.

In another embodiment of the disclosed technology, the rewritable portion of the passive RFID may include other data to the degree that the state of technology allows. Other data contemplated to be stored may include a credit card number, a checking account number, a phone number, and any other data which can feasibly be stored on and transmitted from a passive RFID tag.

In yet another embodiment of a method of the disclosed technology, an additional step of notifying a user when the user has placed a winning bet is disclosed. Every year, millions of dollars in potential winning lottery payouts go unclaimed. This is likely due to mistake or memory lapse on behalf of the lottery player, or a misplaced or stolen lottery ticket. This embodiment of the disclosed technology not only alleviates the need for physical paper lottery tickets but also ensures that a user is made aware of a winning bet. The user may be notified by way of a text message, a telephone call, or an e-mail. The actual notification may be carried out automatically using the data storage system. Furthermore, in the event of a large win (i.e. in excess of $500, $5,000, or $50,000) notification may be made of an employee of the lottery administrator and this lottery administrator may send a personal congratulations, or the like. Still further, with such a high amount, the person may be directed to appear in person to receive a monetary payment or transfer of money into his/her lottery account or personal banking account. The in-person requirement is for security purposes, in embodiments of the disclosed technology.

In a further embodiment of the disclosed technology, a secure Personal Identification Number (PIN) code may be associated with each gambling account and corresponding RFID tag. The PIN code is used for purposes of security, enabling a user to confirm his or her identity when placing a bet or collecting winnings. Furthermore, when a user is notified about a winning bet, the user may be prompted to enter the PIN code in order to view or hear the contents of the notification. Employing the use of a PIN code will eliminate the possibility of theft of a RFID tag or lottery ticket. Furthermore, the PIN will help the lottery administrator to confirm the identity of an account holder in the event of a misplaced RFID tag.

Figure 5:
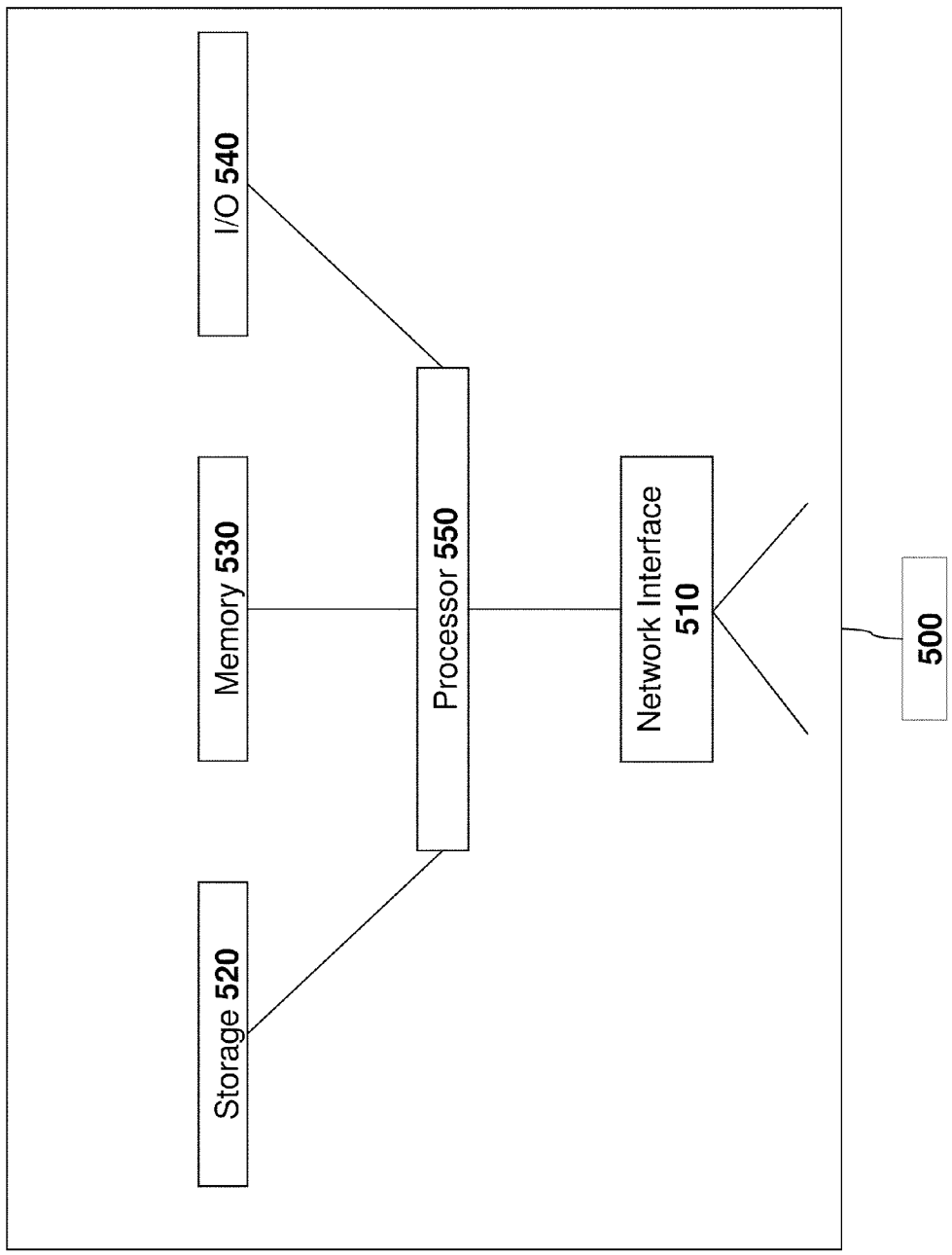
FIG. 5 shows a high-level block diagram of a data storage medium device that may be used to carry out the disclosed technology.

FIG. 5 shows a high-level block diagram of a data storage medium device that may be used to carry out the disclosed technology. Device 500 comprises a processor 550 that controls the overall operation of the computer by executing the device's program instructions which define such operation. The device's program instructions may be stored in a storage device 520 (e.g., magnetic disk, database) and loaded into memory 530 when execution of the console's program instructions is desired. Thus, the device's operation will be defined by the device's program instructions stored in memory 530 and/or storage 520, and the console will be controlled by processor 550 executing the console's program instructions. A device 500 also includes one or a plurality of input network interfaces for communicating with other devices via a network (e.g., the Internet). The device 500 further includes an electrical input interface for receiving power and data from a power or RFID source. A device 500 also includes one or more output network interfaces 510 for communicating with other devices. Device 500 also includes input/output 540 representing devices which allow for user interaction with a computer (e.g., display, keyboard, mouse, speakers, buttons, etc.). One skilled in the art will recognize that an implementation of an actual device will contain other components as well, and that FIG. 5 is a high level representation of some of the components of such a device for illustrative purposes. It should also be understood by one skilled in the art that the method and devices depicted in FIGS. 1 through 4 may be implemented on a device such as is shown in FIG. 5.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

I claim:

1. An electronic lottery/gaming bet/wager placement system comprising:
  a plurality of passive Radio Frequency Identification ("RFID") tags each further comprising stored data, said stored data comprising a unique unchangeable and uncopyable read-only tag identification number;
  a data storage medium under the operative control of a gaming administrator comprising data associated with a plurality of gambling accounts, said data further comprising personal information and payout information associated with an individual, wherein each gambling account of said plurality of gambling accounts is associated with at least one read-only tag identification number of said plurality of RFID tags;
  a near field communication RFID tag reader/writer operable to receive a read-only tag number from an RFID tag of said plurality of RFID tags, and associate a received bet with a gambling account of said plurality of gambling accounts, wherein said gambling account is based on an associated RFID tag; and
  a device carrying out notification to a said individual associated with an account of said plurality of gambling accounts in the event of a winning bet.

2. The system of claim 1, further comprising a wired interface configured for receiving a wager of an individual associated with a gambling account of said plurality of gambling accounts, said interface inoperable for
  said receiving of said wager before said read-only tag number is read by said tag reader.

3. The system of claim 1, wherein said stored data further comprises a writable memory area.

4. The system of claim 3, wherein said writable memory area comprises information associated with the player.

5. The system of claim 1, wherein said data associated with each gambling account of said plurality of gambling accounts further comprises payment information associated with an individual associated with a gambling account.

6. The system of claim 1, wherein a means for communicating is employed to notify a said individual associated with a said gambling account of said plurality of gambling accounts in the event of a winning lottery bet.

7. The system of claim 6, said means for communicating is selected from the group consisting of electronic mail, mobile text message, and phone call.

8. The system of claim 1, further comprising an electronic interface operable by a said individual to manage a said associated gambling account.

9. The system of claim 1, wherein said RFID tag reader further comprises a universal serial bus (USB) port.

10. The system of claim 4, wherein a previous bet is retrieved from said data storage medium, using said RFID tag and placed as a new bet.

11. A method for gaming wager collection and administration comprising the steps of:
  a. providing a data storage medium further comprising a plurality of gambling accounts, wherein each gambling account is associated with a unique, corresponding individual;
  b. providing a plurality of passive Radio Frequency Identification (RFID) tags further comprising stored data, said stored data comprising a unique unchangeable and uncopyable read-only tag number;
  c. correlating, in said data storage medium, each RFID tag of said plurality of RFID tags with a Lag number, so that each RFID Lag is associated with a unique account; wherein said account contains personal information;
  d. providing a Near Field Communication RFID tag reader operable to receive a unique read-only tag number from an RFID tag of said plurality of RFID tags; and
  e. gathering said tag number from one or more of said RFID tags and identifying a said account which is correlative to said tag number;
  f. administering placement of a wager via said tag reader, using said personal information; and g. notifying a said individual associated with an account of said plurality of gambling accounts in the event of a winning bet.

12. The method of claim 11, wherein said account further comprises bet information.

13. The method of claim 12, further comprising a step of automatically receiving a bet electronically via said tag reader, using said bet information and said personal information.

14. The method of claim 11, wherein said stored data further comprises a bet.

15. The method of claim 14, further comprising a step of receiving a bet wirelessly via said tag reader, using said stored data and said personal information.

16. The method of claim 11, wherein said step of notifying is carried out via a mobile text message.

17. The method of claim 11, wherein said RFID tag reader further comprises a universal serial bus (USB) port.

18. The method of claim 17, further comprising the steps of: receiving data from said RFID reader tag via said USB connector plugged into said USB port; and writing data to said RFID tag using said tag reader via said USB connector plugged into said USB port.

19. The method of claim 11, wherein said method is carried out by a casino.

20. The method of claim 11, wherein said method is carried out by a state government.

* * * * *